Nov. 19, 1957 R. E. HOSKINS 2,813,432
POWER TOOL
Filed March 19, 1953
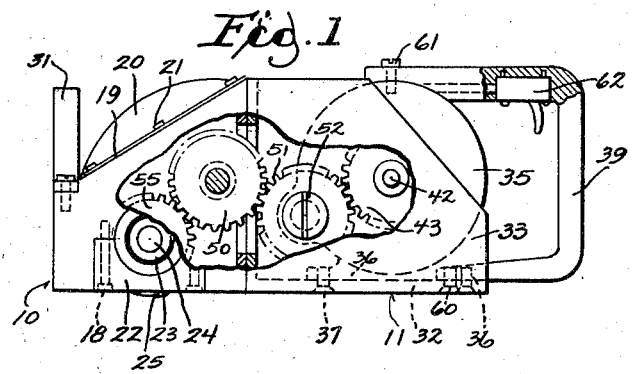
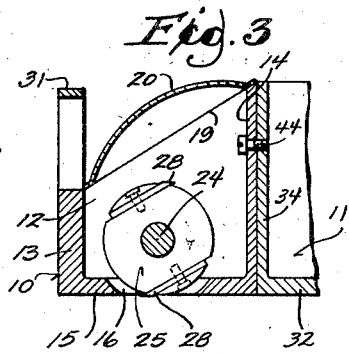
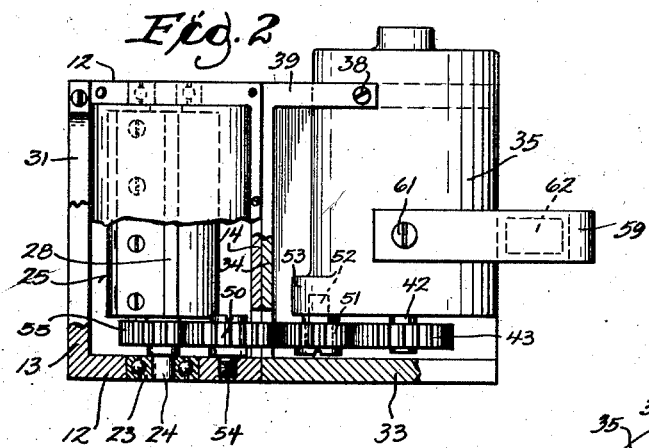
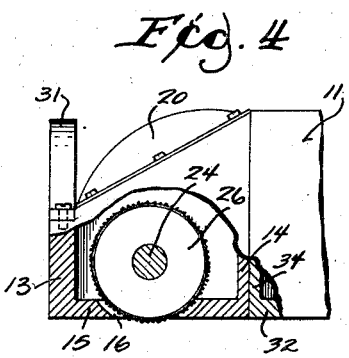
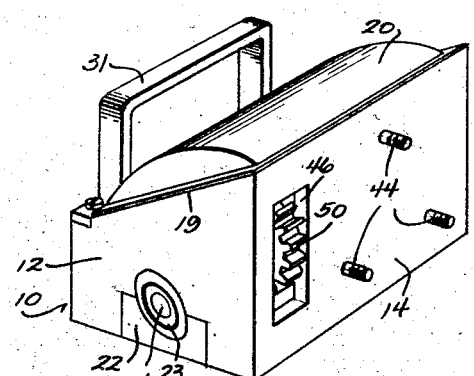
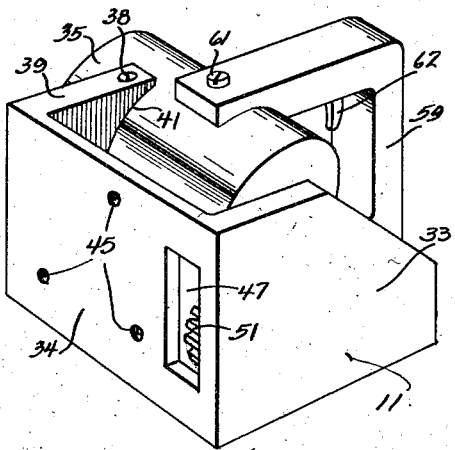
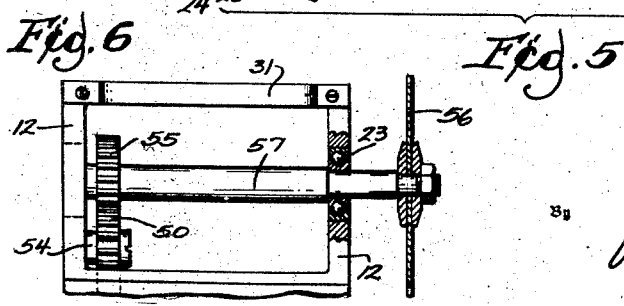
Inventor
RUSSELL E. HOSKINS
By Wheeler, Wheeler & Wheeler
Attorneys

United States Patent Office 2,813,432
Patented Nov. 19, 1957

2,813,432
POWER TOOL
Russell E. Hoskins, Yreka, Calif.
Application March 19, 1953, Serial No. 343,304
9 Claims. (Cl. 74—16)

This invention relates to improvements in power tools, and in particular to a hand controlled multi-purpose power tool.

The invention consists in the combination of a motor mounting housing and one or more separate tool mounting housings, the respective housings have complementary faces which mate when the motor mounting housing is assembled with a tool mounting housing, and power transmission means connecting across said faces whereby when the respective housings are assembled the motor and tool will be geared for drive purposes. A number of separate tool mounting housings adapted for mounting different tools may be interchangeably used with a single motor mounting housing, assembly of the respective housings and interconnection of the drive mechanism being accomplished simply by mating the respective housings upon their complementary faces.

In this connection it is an important feature of the invention that engagement and disengagement of driving connections to the tool occurs automatically upon assembly or disassembly of the tool mounting housing with the motor mounting housing.

In the drawings:

Fig. 1 is a side elevation of an interconnected assembly of a tool mounting housing and a motor mounting housing, portions of the side walls of the respective housings being broken away to expose the driving connections from the motor to the tool.

Fig. 2 is a plan view of an interconnected assembly of a tool mounting housing and a motor mounting housing, portions of the tool mounting housing cover being broken away to expose the driving connections from the motor to the tool.

Fig. 3 is a vertical cross section taken principally through the tool mounting housing, a portion of the motor mounting housing in connection therewith being shown fragmentarily.

Fig. 4 is a side elevational view, similar to that shown in Fig. 3, a different type of tool being illustrated, and a side wall of the housing being broken away to expose said tool.

Fig. 5 is a perspective view in spaced apart relationship of a tool mounting housing and a motor mounting housing, this view showing the complementary faces upon which the respective housings are mounted in unitary assembly.

Fig. 6 is a plan view of the tool mounting housing only, the cover being removed to expose the shaft of the tool which is normally housed within the housing and which is adapted to be extended to support tools exteriorly of the tool mounting housing.

As best shown in Fig. 5 the device comprises wholly separable units comprising a tool mounting housing 10 and a motor mounting housing 11. The respective housings are, however, adapted for interconnection as hereinafter explained.

The tool mounting housing 10 comprises end walls 12, a front wall 13, a rear wall 14 and a bottom 15 which is provided with a slot 16 (see Figs. 3 and 4) through which a portion of a tool normally extends for contact with the work. Front wall 13 of the housing 10 is of less height than rear wall 14. The top margins 19 of end walls 12 are inclined downwardly from the top margin of rear wall 14 to the top margin of front wall 13. The top of the housing is closed by cover dome 20 secured to the front and end walls 13 and 12 by bolts 21.

The end walls 12 are relieved at their bottom margins to receive removable bearing blocks 22 mounted by means of bolts 18. The bearing blocks 22 retain ball bearings 23 which support at its ends, shaft 24 upon which a rotating tool, such as the shaper 25 in Fig. 3, or the sanding cylinder 26 in Fig. 4, is carried.

As best shown in Figs. 3 the shaper is conventional and comprises a generally cylindrical body 27 having blades 28 adjustably mounted thereon. The blades 28 project through the slot 16 in the housing bottom 15 in the course of cylinder rotation whereby to be effective upon the work.

Also mounted to the front wall 13 of the tool mounting housing by the bolts 21 is a handle grip 31 by means of which the device may be manipulated by the operator.

The motor mounting housing is of comparable construction and comprises a bottom 32, end walls 33 and 39, and a front wall 34. Securely mounted to the housing is an electric motor 35 having feet 36 secured by bolts 37 to the bottom wall 32 of the motor mounting housing. The top of the motor is desirably bolted to end wall 39 by bolt 38, the end wall 39 being cut out at 41 to receive the motor. Motor 35 is provided with an armature shaft 42 which carries an output or drive gear 43.

The respective rear and front walls 14 and 34 of the tool mounting housing and the motor mounting housing respectively comprise complementary faces upon which the tool mounting housing and motor mounting housing may be mated or assembled. For this purpose the face 14 of the tool mounting housing may be provided with projecting threaded bolts 44 which are adapted to be detachably engaged with the threaded taps 45 in the face 34 of the motor mounting housing. The respective faces 14 and 34 are also provided with openings 46 and 47 which align when the respective housings are coupled and through which power transmitting gears 50 and 51 mesh when the housings are assembled.

Gear 51, which meshes with drive gear 43 in the motor mounting housing, is supported on a jack shaft 52 mounted on ear 53 of motor 35. For safety purposes the mounting is such that the front periphery of gear 51 is rearwardly offset from the face 34 of the motor mounting housing. Gear 50, in the tool mounting housing, is mounted on a jack shaft 54 mounted in the end wall 12. Gear 50 projects outwardly from the face 14 of the tool mounting housing whereby to extend into the opening 47 in the motor mounting housing to engage the gear 51 when the housings are assembled. Gear 50 comprises an intermediate gear in mesh with gear 55 on shaft 24 of the tool in the tool mounting housing.

The respective gears 50 and 51 are engaged without requiring special attention on the part of the operator to connect the tool with the motor when the respective housings are assembled and to disengage the driving connection to the tool when the respective housings are disassembled. While the type of drive from the motor 35 to the tool is broadly immaterial, the gear arrangement illustrated is preferred because of the simplicity and ease with which the driving connection is made simultaneously with mating the respective housings upon their complementary faces 14 and 34.

As best shown in Fig. 6, the tool shaft 24 of the Fig. 2 embodiment of the invention may be replaced by an arbor 57 which has a portion projecting laterally from the housing. In this arrangement a tool, such as the saw 56, may be carried exteriorly of the housing. The saw 56 is illustrated for purposes of exemplification only as other tools such as conventional grinders, buffers, etc., could be substituted therefor. As before indicated a variety of conventional tools may be employed within the housing, the shaper 27 shown in Fig. 3 and the sander 26 shown in Fig. 4 being examples only.

The motor mounting housing is further provided with a handle 59 which is transversely disposed respecting handle grip 31 on the tool mounting housing. Handle 59 is connected by bolt 60 with the bottom 32 of the motor mounting housing (Fig. 1) and by bolt 61 with the top of the motor 35. Handle 59 is also provided with a conventional switch mechanism 62 by means of which the motor may be controlled.

By reason of the inclined top of the tool mounting housing, and the mounting of the handle 31 to the lower front side thereof, the top hand grip portion of handle 31 is disposed at approximately the same level as the top of handle 59. Accordingly, manipulation and control of the assembled tool is made more convenient than would be the case if handle 31 projected substantially above the top of the handle 59.

In the preferred embodiment of the invention the respective tools such as shapers, sanders, grinders, saws and the like may each be mounted in a separate and individual tool mounting housing which may be interchangeably mounted upon the complementary face 34 of a single motor mounting housing 11. Connection of any one of said tool mounting housings will automatically engage the drive mechanism whereby the tool is then powered from motor 35 as controlled by switch 62. Disassembly of the housing uncouples the driving connection. When assembled the respective bottoms of the housings are disposed on a common plane to facilitate accurate carpentry operations with the tool. While interchangeable operation of the tool and motor housings is preferred, the top cover 20 of the tool mounting housing is readily removable in the event it is desired to change tools in a single tool mounting housing.

I claim:

1. A hand power tool comprising in combination, a motor mounting housing and a tool mounting housing, said housings having complementary mating face walls upon which the housings are assembled to function as a unit, and hand grips by which said housings may be manipulated as a unit in carpentry operations, said face walls having openings aligned when the housings are assembled, and motion transmitting mechanism engaging through said openings when the housings are assembled.

2. The device of claim 1 wherein said motion transmitting mechanism comprises a driving gear in the motor mounting housing and a driven gear in the tool mounting housing, said gears being radially aligned through said face wall openings whereby to mesh when the housings are assembled.

3. The device of claim 2 wherein the driving gear in the motor mounting housing is recessed from the face wall of the housing, and the driven gear in the tool mounting housing projects therefrom whereby to enter the opening of the motor mounting housing and mesh with the driving gear when the housings are assembled.

4. A tool comprising in combination, a motor mounting housing and a tool mounting housing, said housings having complementary mating face walls upon which the housings are assembled to function as a unit, said face walls together constituting partitions between the interiors of said housings when the housings are mated, and individually constituting closures for the housings when they are separated, said housings being provided at said face walls with complementary driving and driven elements which automatically engage when the housings are assembled and disengage when the housings are disassembled.

5. The device of claim 4 wherein said driving and driven elements comprise radially aligned gears in said housings, said face walls being apertured in alignment with said gears to permit engagement of the gears across the faces, the gear in said motor mounting housing being rearwardly offset from the face wall of said mounting.

6. The device of claim 4 in which said tool mounting housing has a top wall downwardly inclined toward the front of the housing, and a handle grip mounted at the front of the housing.

7. The device of claim 4 in further combination with a tool in said tool mounting housing and a motor on said motor mounting housing, said tool and motor having respectively driven and driving rotors, said driving and driven elements comprising intermediate rotors mounted in each housing and engaged with said driven and driving rotors.

8. A multi-purpose hand tool comprising the combination of separate component units which are respectively provided with complementary plane face walls, means on said face walls for coupling said units together for unitary operation, one of said units comprising a motor mounting housing having a motor shaft, a driving element and motion transmitting connections from said shaft to said driving element, and another of said component units comprising a tool mounting housing having a tool shaft having motion receiving connections including a driven element, said complementary face walls of said component units being provided with openings aligned when the parts are unitarily assembled and said driving and driven elements being likewise aligned for mutual engagement through said openings when the units are assembled.

9. The device of claim 8 wherein said driving and driven elements comprise gears, the gear mounted in the motor mounting housing being recessed from the opening in the face wall of said housing and the gear mounted in the tool mounting housing projecting from the opening in the face wall of said housing whereby to mesh with said gear in said motor mounting housing when said units are assembled.

References Cited in the file of this patent

UNITED STATES PATENTS

| | | |
|---|---|---|
| 1,589,093 | Barrett | June 15, 1926 |
| 1,608,920 | Anderson | Nov. 30, 1926 |
| 2,053,535 | Schielein | Sept. 8, 1936 |
| 2,069,700 | Emmons | Feb. 2, 1937 |